(12) United States Patent
Yamaguchi et al.

(10) Patent No.: US 7,296,556 B2
(45) Date of Patent: Nov. 20, 2007

(54) CONTROL SYSTEM FOR INTERNAL COMBUSTION ENGINE

(75) Inventors: Satoshi Yamaguchi, Wako (JP); Yuichi Shimasaki, Wako (JP); Mamoru Hasegawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/485,470

(22) Filed: Jul. 13, 2006

(65) Prior Publication Data

US 2007/0012290 A1 Jan. 18, 2007

(30) Foreign Application Priority Data

Jul. 15, 2005 (JP) ............... 2005-206598

(51) Int. Cl.
*F02D 41/40* (2006.01)

(52) U.S. Cl. ................. 123/305; 123/435; 123/406.43; 701/105

(58) Field of Classification Search ................ 123/305, 123/406.43, 435; 701/105
See application file for complete search history.

(56) References Cited

U.S. PATENT DOCUMENTS

| | | | |
|---|---|---|---|
| 4,722,310 A | | 2/1988 | Igashira et al. |
| 5,718,203 A | * | 2/1998 | Shimada et al. ............ 123/305 |
| 6,530,361 B1 | * | 3/2003 | Shiraishi et al. ............ 123/435 |
| 6,557,528 B2 | * | 5/2003 | Hiltner ................... 123/406.43 |
| 7,000,596 B2 | * | 2/2006 | Zurloye et al. ............ 701/105 |
| 7,013,865 B2 | * | 3/2006 | Nagai et al. ................ 123/305 |
| 2004/0177830 A1 | | 9/2004 | Yamaoka et al. |

FOREIGN PATENT DOCUMENTS

| | | |
|---|---|---|
| EP | 0 905 361 A2 | 3/1999 |
| EP | 1 445 456 A2 | 8/2004 |
| JP | 11-107820 A | 4/1999 |
| JP | 2004-100566 | 4/2004 |

\* cited by examiner

*Primary Examiner*—Erick Solis
(74) *Attorney, Agent, or Firm*—Arent Fox LLP

(57) ABSTRACT

A control system for an internal combustion engine having a fuel injector located in a combustion chamber of the engine for injecting fuel into the combustion chamber. The fuel injection timing stored in a fuel injection timing map is retrieved according to the detected engine operating condition to determine the fuel injection timing. An actual ignition timing of the fuel injected into the combustion chamber is detected. An ignition delay of the actual ignition timing with respect to the target ignition timing, which is set according to the engine operating condition and a fuel injection timing correction amount, is calculated according to the calculated ignition delay. The fuel injection timing is corrected with the fuel injection timing correction amount, and the fuel injection is executed according to the corrected fuel injection timing.

6 Claims, 6 Drawing Sheets

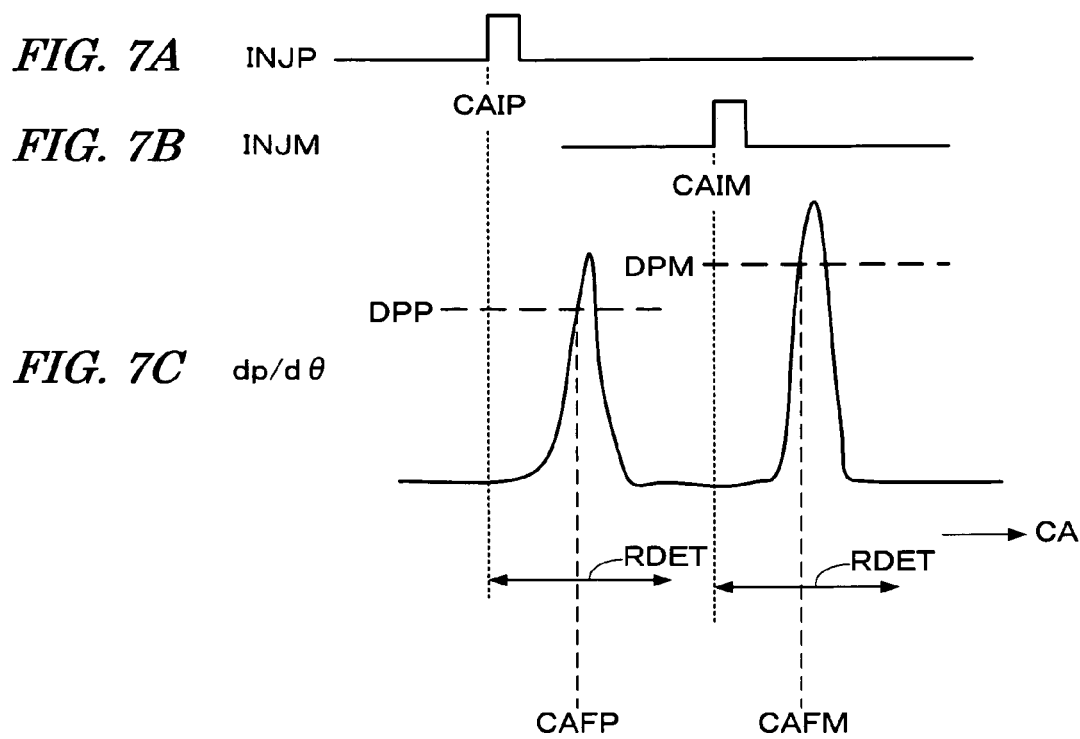
FIG. 7A  INJP
FIG. 7B  INJM
FIG. 7C  dp/dθ
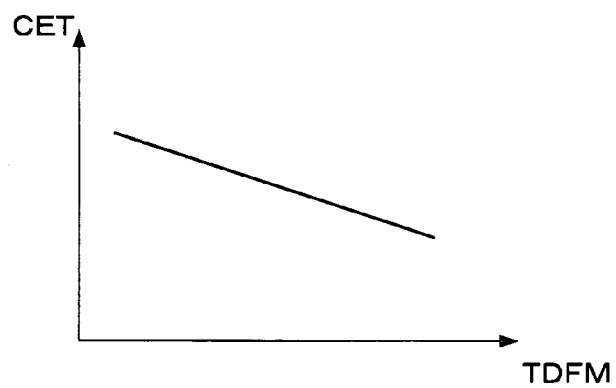
FIG. 8

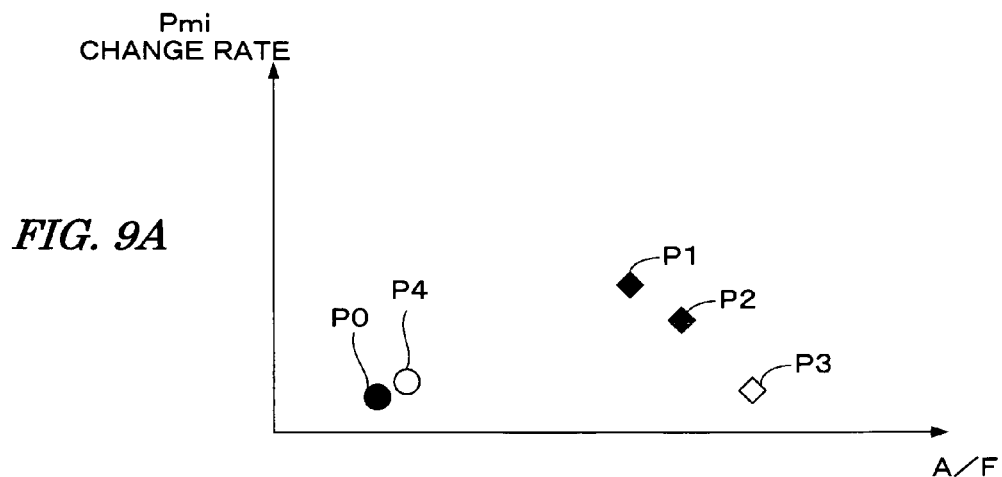
FIG. 9A
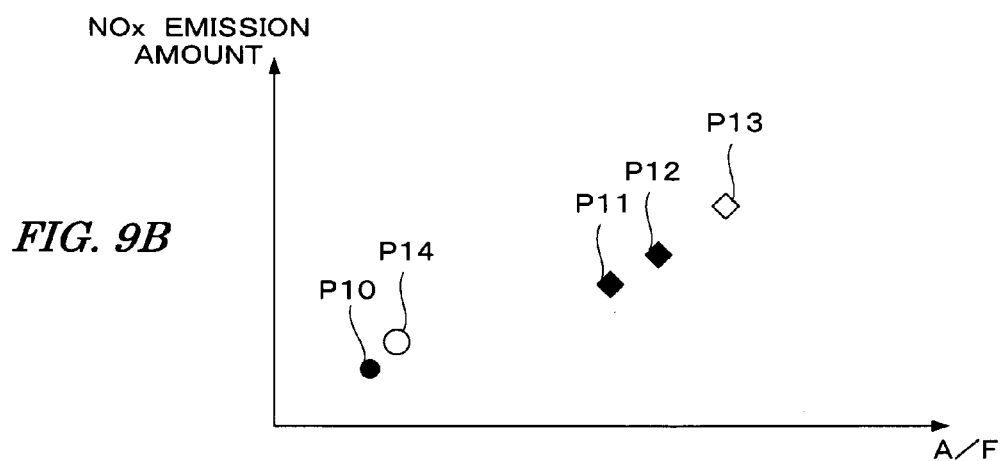
FIG. 9B
FIG. 10
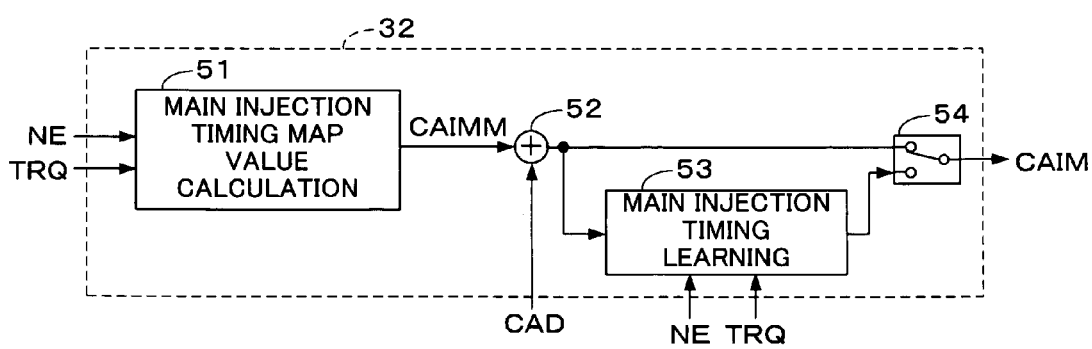

CONTROL SYSTEM FOR INTERNAL COMBUSTION ENGINE

BACKGROUND OF THE INVENTION

1. Field of the Invention

The present invention relates to a control system for an internal combustion engine, and particularly, to a system for controlling an internal combustion engine according to a pressure in the cylinder detected by a cylinder pressure sensor.

2. Description of the Related Art

Japanese Patent Laid-open No. 2004-100566 (JP '566) discloses a fuel injection control apparatus in which the cylinder pressure (pressure in the combustion chamber) is detected by a cylinder pressure sensor, and a fuel injection amount, a fuel injection timing, and the like, are controlled according to the detected cylinder pressure. According to the disclosed apparatus, the crank angle Cmax at which the cylinder pressure reaches a maximum value is detected, and the fuel injection timing is corrected so that the detected crank angle Cmax coincides with a target value which is previously set according to the engine operating condition.

If the internal combustion engine is a diesel engine, an actual ignition timing changes depending on the cetane number of the fuel being used, even if the fuel injection timing is the same. Therefore, the control used by the above-described conventional apparatus is effective when the combustion characteristic of fuel changes.

However, a specific method for correcting the fuel injection timing is not shown in JP '566. For example, if the cylinder pressure is to be detected during comparatively short periods of time and control is to be performed based on the detection results, the calculation load on the control apparatus increases. Accordingly, correction of the fuel injection timing must be performed without excessively increasing the calculation load on the control apparatus. However, the apparatus shown in JP '566 is not configured in contemplation of such a situation, thereby delaying performance of the control.

SUMMARY OF THE INVENTION

The present invention was attained contemplating the above-described points, and an aspect of the present invention is to provide a control system for an internal combustion engine which detects an actual ignition timing of fuel based on the cylinder pressure detected by the cylinder pressure sensor and which appropriately executes a correction calculation of the fuel injection timing according to the detected actual ignition timing, wherein any increase in the calculation load is suppressed.

In order to attain the above aspect, the present invention provides a control system for an internal combustion engine having a fuel injection means located in a combustion chamber of the engine for injecting fuel into the combustion chamber. The control system includes fuel injection timing storing means, operating condition detecting means, fuel injection control means, ignition timing storing means, ignition timing detecting means, and fuel injection timing correction amount calculating means. The fuel injection timing storing means stores fuel injection timings (CAIMM) of the fuel injection means. The fuel injection timings (CAIMM) are set according to the operating condition (NE, TRQ) of the engine. The operating condition detecting means detects an operating condition of the engine. The fuel injection control means retrieves the fuel injection timing (CAIMM) stored by the fuel injection timing storing means according to the detected engine operating condition to determine the fuel injection timing and executes a fuel injection through the fuel injection means. The ignition timing storing means stores target ignition timings (CAFMM) of the fuel injected into the combustion chamber. The target ignition timings (CAFMM) are set according to the operating condition of the engine. The ignition timing detecting means detects an actual ignition timing (CAFM) of the fuel injected into the combustion chamber, based on a change $(dp/d\theta)$ in a pressure in the combustion chamber. The fuel injection timing correction amount calculating means calculates an ignition delay of the actual ignition timing (CAFM) with respect to the target ignition timing (CAFMM) and calculates a fuel injection timing correction amount (CAD) according to the calculated ignition delay (DCAM). The fuel injection control means corrects the fuel injection timing (CAIMM) by the fuel injection timing correction amount (CAD), and executes the fuel injection according to the corrected fuel injection timing (CAIM). In the present invention, the "ignition timing" means the compression ignition timing that is a timing of ignition caused not by the spark plug but by the compression of the air-fuel mixture.

With the above-described configuration, the fuel injection timing is retrieved from the fuel injection timing storing means that stores the fuel injection timings that are set according to the operating condition of the engine, and the target ignition timing is retrieved from the ignition timing storing means that stores the target ignition timings that are set according to the operating condition of the engine. Further, the actual ignition timing of fuel is detected, the ignition delay of the actual ignition timing with respect to the target ignition timing is calculated, the fuel injection timing correction amount is calculated according to the calculated ignition delay, and the fuel injection timing is corrected with the fuel injection timing correction amount. The fuel injection is executed according to the corrected fuel injection timing. By calculating the ignition delay of the actual ignition timing with respect to the target ignition timing that is previously set according to the engine operating condition and calculating the fuel injection timing correction amount according to the ignition delay, the calculation load on the control system is reduced, wherein controllability of the control system is improved.

Preferably, the fuel injection timing correction amount calculating means includes ignition delay learning value calculating means for calculating a learning value (DCAMFLRN) of the ignition delay and calculates the fuel injection timing correction amount (CAD) using the learning value (DCAMFLRN) of the ignition delay.

With the above-described configuration, the learning value of the ignition delay is calculated. The fuel injection timing correction amount is then calculated using the learning value. Accordingly, it is possible to prevent the ignition timing from deviating from the desired value.

Preferably, the fuel injection control means includes fuel injection timing learning means for calculating a learning value (CAIMLRN) of the corrected fuel injection timing (CAIM) and executes the fuel injection according to the learning value (CAIMLRN) of the fuel injection timing.

With the above-described configuration, the learning value of the corrected fuel injection timing is calculated, and the fuel injection is executed according to the learning value. Therefore, after completion of the learning, it is possible to perform the fuel injection at a suitable fuel injection timing from the instant engine operation begins.

BRIEF DESCRIPTION OF THE DRAWINGS

FIGS. 7A-7C are time charts illustrating an ignition timing detection method;

FIG. 8 illustrates a table used for calculating a cetane number (CET) from an ignition delay time period (TDFM);

FIGS. 9A and 9B illustrate a reason for stopping the exhaust gas recirculation; and FIG. 10 is a block diagram illustrating a configuration of the modification of the main injection timing calculation block illustrated in FIG. 3.

DETAILED DESCRIPTION OF THE PREFERRED EMBODIMENTS

Preferred embodiments of the present invention will now be described with reference to the drawings.

Figure 1:
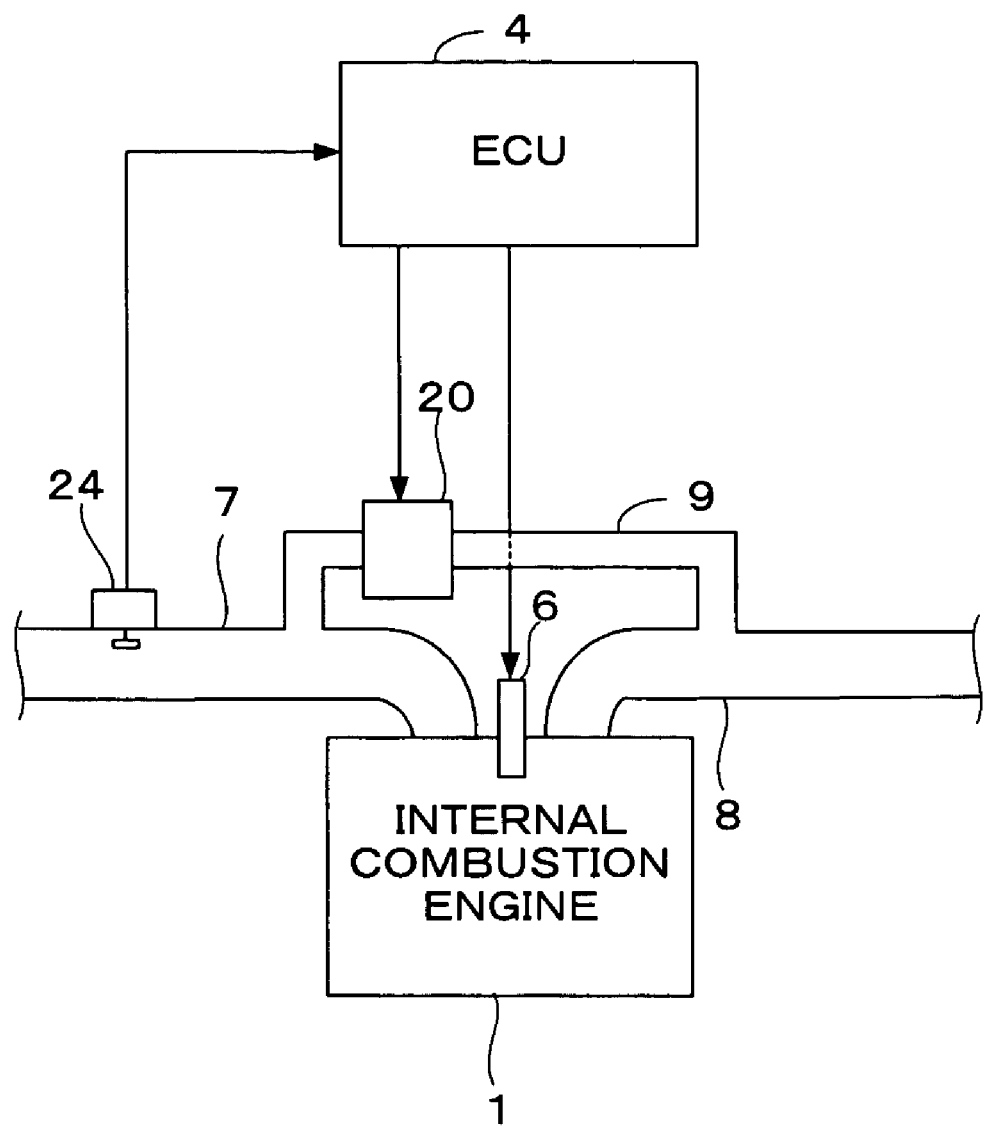
FIG. 1 is a schematic diagram illustrating an internal combustion engine and a control system therefor according to one embodiment of the present invention.
Figure 2:
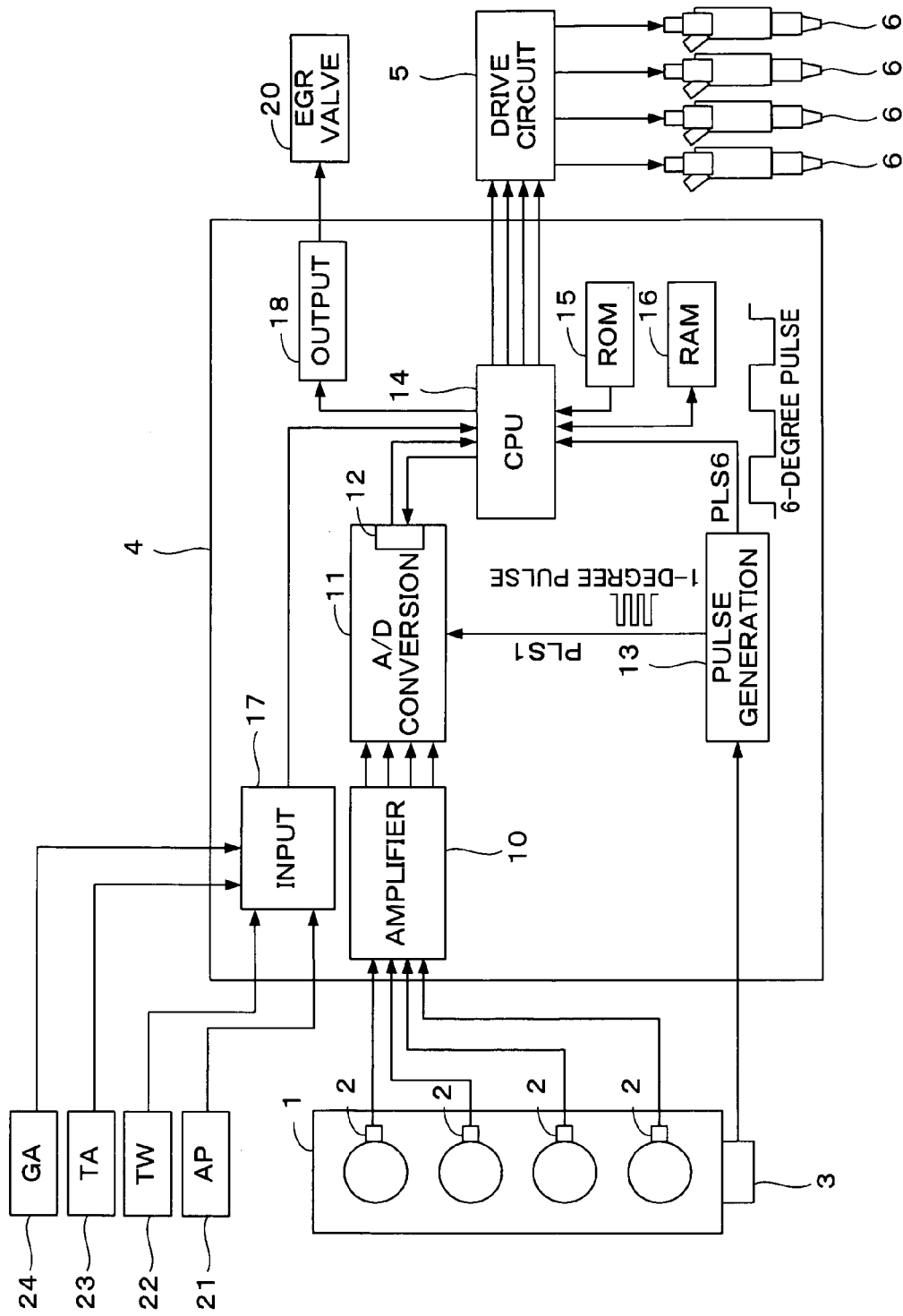
FIG. 2 is a schematic diagram illustrating a configuration of a part of the control system illustrated in FIG. 1.

FIGS. 1 and 2 are schematic diagrams illustrating a configuration of an internal combustion engine and a control system therefor according to one embodiment of the present invention. The internal combustion engine 1 (hereinafter referred to as "engine"), which has four cylinders, is a diesel engine, wherein fuel is injected directly into the cylinders. Each cylinder is provided with a fuel injection valve 6 that is electrically connected to an electronic control unit 4 (hereinafter referred to as "ECU 4"). The ECU 4 controls a valve opening period and a valve opening timing of each fuel injection valve 6. That is, the fuel injection period and fuel injection timing are controlled by the ECU 4.

The engine 1 has an intake pipe 7 and an exhaust pipe 8. An exhaust gas recirculation passage 9 for recirculating a part of exhaust gases to the intake pipe 7 is provided between the exhaust pipe 8 and the intake pipe 7. The exhaust gas recirculation passage 9 is provided with an exhaust gas recirculation control valve 20 (hereinafter referred to as "EGR valve") that controls the amount of exhaust gases that are recirculated. The EGR valve 20 is an electromagnetic valve having a solenoid. The valve opening of the EGR valve 20 is controlled by the ECU 4. The exhaust gas recirculation passage 9 and the EGR valve 20 form the exhaust gas recirculation mechanism.

Each cylinder of the engine 1 is provided with a cylinder pressure sensor 2 for detecting a cylinder pressure (a pressure in the combustion chamber of the engine 1). In this embodiment, the cylinder pressure sensor 2 is configured in one body together with a glow plug disposed in each cylinder. The detection signal of the cylinder pressure sensor 2 is supplied to the ECU 4. It is to be noted that the detection signal of the cylinder pressure sensor 2 corresponds to a differential signal of the cylinder pressure PCYL with respect to the crank angle (time). The cylinder pressure PCYL is obtained by integrating the output of the cylinder pressure sensor.

The engine 1 is provided with a crank angle position sensor 3 for detecting a rotational angle of the crankshaft (not shown) of the engine 1. The crank angle position sensor 3 generates one pulse at every 1 degree of the crank angle, and the pulse is supplied to the ECU 4. The crank angle position sensor 3 further generates a cylinder discrimination pulse at a predetermined crank angle for a specific cylinder of the engine 1, and then supplies the cylinder discrimination pulse to the ECU 4.

An accelerator sensor 21 for detecting an operation amount AP of the accelerator pedal of the vehicles driven by the engine 1, a coolant temperature sensor 22 for detecting a coolant temperature TW of the engine 1, an intake air temperature sensor 23 for detecting an intake air temperature TA of the engine 1, and an intake air flow rate sensor 24 for detecting an intake air flow rate GA of the engine 1 are connected to the ECU 4. The detection signals of these sensors are supplied to the ECU 4.

A control signal of the fuel injection valve 6 located in the combustion chamber of each cylinder of the engine 1 is provided by the ECU 4 to a drive circuit 5. The drive circuit 5 is connected to the fuel injection valves 6 and supplies the driving signals according to the control signal from the ECU 4 to the fuel injection valves 6. Fuel is injected into the combustion chamber of each cylinder based on a fuel injection timing in accordance with a control signal that is output from the ECU 4. The amount of fuel that is injected is controlled to a value in accordance with the control signal from the ECU 4.

The ECU 4 includes an amplifier 10, an A/D conversion block 11, a pulse generation block 13, a CPU 14 (Central Processing Unit), a ROM 15 (Read Only Memory) for storing programs executed by the CPU 14, a RAM 16 (Random Access Memory) for storing calculation results, and the like, an input circuit 17, and an output circuit 18. The detection signal of the cylinder pressure sensor 2 is input to the amplifier 10. The amplifier 10 amplifies the input signal. The signal amplified by the amplifier 10 is then input to the A/D conversion block 11. The pulse signal output from the crank angle position sensor 3 is input to the pulse generation block 13.

The A/D conversion block 11, which includes a buffer 12, converts the cylinder pressure sensor output from the amplifier 10 to a digital value (hereinafter referred to as "pressure change rate") $dp/d\theta$ and stores the converted digital value in the buffer 12. Specifically, a pulse signal PLS1 (hereinafter referred to as "one-degree pulse") having a crank angle period of one degree is supplied to the A/D conversion block 11 from the pulse generation block 13. The cylinder pressure sensor output is sampled at intervals of the one-degree pulse PLS1 and converted to a digital value. The digital value is then stored in the buffer 12.

A pulse signal PLS6 having a crank angle period of six degrees is supplied to the CPU 14 from the pulse generation block 13. The CPU 14 performs a process for reading the digital value stored in the buffer 12 at intervals of the six-degree pulse PLS6. That is, in the present embodiment, the A/D conversion block 11 does not request an interrupt from the CPU 14, but the CPU 14 does perform the reading process at intervals of the six-degree pulse PLS6.

The input circuit 17 converts the detection signals from various sensors to digital values and supplies the digital values to the CPU 14. An engine rotational speed NE is calculated from the time period of the six-degree pulse PLS6. A demand torque TRQ of the engine 1 is calculated according to the operation amount AP of the accelerator pedal.

The CPU 14 calculates a duty ratio of a control signal for controlling an opening of the EGR valve 20 according to the engine operating condition. The CPU 14 supplies the duty control signal which controls opening of the EGR valve 20 to the EGR valve 20 through the output circuit 18.

Figure 3:
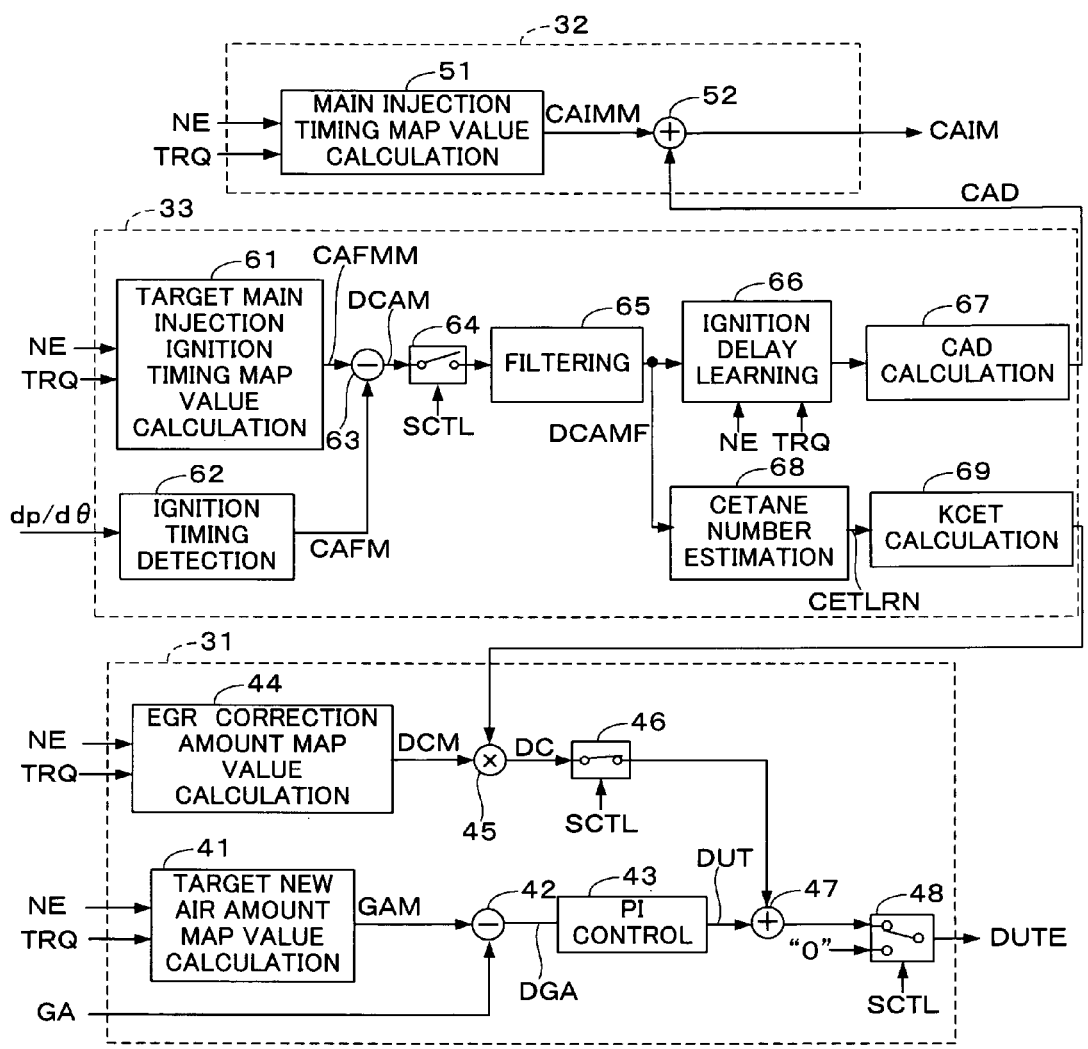
FIG. 3 is a block diagram illustrating a configuration of a module for calculating a control duty ratio (DUTE) of a control signal supplied to an exhaust gas recirculation control valve and a main injection timing (CAIM)

FIG. 3 is a block diagram illustrating a configuration of a module which calculates a main injection timing CAIM of the fuel injection valve 6 and a duty ratio (hereinafter referred to as "control duty ratio") DUTE of the control signal supplied to the EGR valve 20. The function of the module is realized by the processes executed by the CPU 14.

The module illustrated in FIG. 3 includes a duty ratio calculation block 31, a main injection timing calculation block 32, and a correction amount calculation block 33. The duty calculation block 31 calculates the control duty ratio DUTE. The main injection timing calculation block 32 calculates the main injection timing CAIM. The correction amount calculation block 33 calculates an ignition delay based on the output of the cylinder pressure sensor, calculates a fuel injection timing correction amount CAD, estimates a cetane number CET of fuel in use, and calculates a correction coefficient KCET according to the estimated cetane number CET.

The duty ratio calculation block 31 includes a target fresh air amount map value calculation block 41, a subtracting block 42, a PI control block 43, an EGR correction amount map value calculation block 44, a multiplying block 45, switching blocks 46 and 48, and an adding block 47. The target fresh air amount map value calculation block 41 retrieves a GAM map which is previously set according to the engine rotational speed NE and the demand torque TRQ to calculate the target fresh air amount map value GAM. The GAM map is set based on a fuel having a high cetane number (e.g., "57"). The subtracting block 42 subtracts the intake air flow rate GA detected by the intake air flow rate sensor 24 from the target fresh air amount map value GAM to calculate a deviation DGA. The PI control block 43 calculates a duty ratio DUT of the control signal supplied to the EGR valve 20 by the PI (proportional and integral) control so that the deviation DGA becomes "0".

The EGR correction amount map value calculation block 44 retrieves a DCM map which is previously set according to the engine rotational speed NE and the demand torque TRQ to calculate an EGR correction amount map value DCM. The DCM map is set based on a fuel having a low cetane number (e.g., "40") so that the EGR amount is corrected about 15% per 1 cetane number. The multiplying block 45 multiplies a correction coefficient KCET by the EGR correction amount map value DCM to calculate an EGR correction amount DC. The correction coefficient KCET is calculated according to the cetane number CET of the fuel being used by the correction amount calculation block 33.

Figure 4:
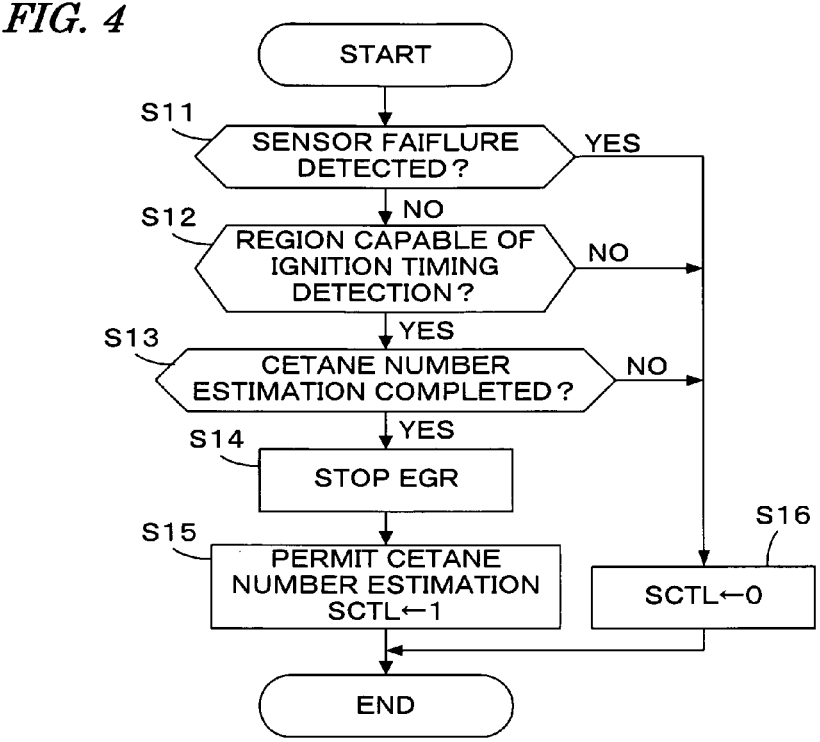
FIG. 4 is a flowchart illustrating a process for setting the switching control signal (SCTL) supplied to a switching block illustrated in FIG. 3.

The adding block 47 adds the EGR correction amount DC to the duty ratio DUT calculated in the PI control block 43 to calculate the control duty ratio DUTE of the EGR valve 20. The switching blocks 46 and 48 are supplied with a switching control signal SCTL. When the switching control signal SCTL is "0", the switching block 46 maintains the ON state, as illustrated in FIG. 3, and the switching block 48 selects the output of the adding block 47. The switching control signal SCTL is set to "1" when the estimation process, which is illustrated in FIG. 4, of a cetane number of the fuel being used is executed. Otherwise, the switching control signal SCTL is set to "0". Therefore, when executing the cetane number estimation process, the switching block 46 is turned off, and the switching block 48 selects the input of "0" (which means the full closure of the EGR valve). Accordingly, the exhaust gas recirculation is stopped while executing the cetane number estimation process.

In step S11 of FIG. 4, it is determined whether any of the sensors (i.e., the crank angle position sensor 3, the accelerator sensor 21, and the cylinder pressure sensor 2), necessary for the cetane number estimation process, have failed. If the answer to step S11 is affirmative (YES), the switching control signal SCTL is set to "0" (step S16). If no failure of the sensors is detected, it is determined whether the engine operating condition is in a predetermined operating region (for example, a region where the engine rotational speed NE is within the range from 1000 to 3000 rpm and the demand torque TRQ is within the range from 0 to 250 Nm) in which the accurate detection of the ignition timing (i.e., the estimation of the accurate cetane number) can be performed (step S12). If the answer to step S12 is negative (NO), the process proceeds to step S16 described above. If the engine operating condition is in the predetermined operating region, it is determined whether the cetane number estimation is completed (step S13). Since the answer to step S13 is negative (NO) at first, the exhaust gas recirculation is stopped (step S14) to permit the cetane number estimation process and the learning of the ignition delay to occur, i.e., the switching control signal SCTL is set to "1" (step S15). Thereafter, when the estimation process is completed, the process proceeds to step S16 from step S13.

Next, the reason for stopping the exhaust gas recirculation is described below with reference to FIGS. 9A and 9B. FIG. 9A illustrates a relationship between the air-fuel ratio A/F and the rate of change in the indicated mean effective pressure Pmi (hereinafter referred to as "Pmi change rate"). The point P0 shown in FIG. 9A indicates a normal operating condition. The points P1 and P2 indicate an operating condition in which the exhaust gas recirculation is performed and the Pmi change rate has increased. In the operating condition of the point P1 or P2, the ignition timing cannot be accurately detected, and consequently, the cetane number cannot be accurately estimated. If the exhaust gas recirculation is stopped in the condition of the point P1 or P2, the operating condition shifts to the operating condition indicated by the point P3. That is, the air-fuel ratio changes toward a leaner air-fuel ratio, and the Pmi change rate decreases to a level of the normal operating condition. In the operating condition indicated by the point P3, the cetane number can accurately be estimated. Therefore, in the present embodiment, the exhaust gas recirculation is stopped when the execution condition of the cetane number estimation is satisfied. Also, the Pmi change rate is reduced to the normal level by reducing the recirculation amount of exhaust gases instead of stopping the exhaust gas recirculation. Therefore, the recirculation amount of exhaust gases is reduced instead of stopping the exhaust gas recirculation when the execution condition of the cetane number estimation is satisfied. The point P4 shown in FIG. 9A indicates an operating condition when the fuel injection timing is corrected according to the estimated cetane number CET.

Further, FIG. 9B illustrates a relationship between an emission amount of NOx and the air-fuel ratio A/F. The operating condition corresponding to those indicated by the points P0-P4 illustrated in FIG. 9A are indicated by the points P10-P14 in FIG. 9B. By stopping the exhaust gas recirculation, the points P11 and P12 shift to the point P13 and the emission amount of NOx temporarily increases.

However, the emission amount of NOx can be reduced to the normal level (i.e., the point P14) by correcting the fuel injection timing and restarting the exhaust gas recirculation after completion of the cetane number estimation process.

Returning back to FIG. 3, the main injection timing calculation block 32 includes a main injection timing map value calculation block 51 and an adding block 52. The main injection timing map value calculation block 51 retrieves a CAIMM map which is previously set according to the engine rotational speed NE and the demand torque TRQ to calculate a main injection timing map value CAIMM. The CAIMM map is set based on a fuel of a predetermined cetane number (for example, the average cetane number in the market).

The adding block 52 adds the fuel injection timing correction amount CAD calculated in the correction amount calculation block 33 to the main injection timing map value CAIMM to calculate a main injection timing CAIM.

The correction amount calculation block 33 includes a target main injection ignition timing map value calculation block 61, an ignition timing detection block 62, a subtracting block 63, a switching block 64, a filtering block 65, an ignition delay learning block 66, a CAD calculation block 67, a cetane number estimation block 68, and a KCET calculation block 69. The target main injection ignition timing map value calculation block 61 retrieves a CAFMM map which is previously set according to the engine rotational speed NE and the demand torque TRQ to calculate a target main injection ignition timing map value CAFMM. The CAFMM map is set based on the fuel of a predetermined cetane number (for example, the average cetane number in the market). The ignition timing detection block 62 detects a main injection ignition timing CAFM according to the pressure change rate dp/dθ which is obtained by converting the output signal of the cylinder pressure sensor 2 to a digital value. The detection method is described later with reference to FIGS. 5 to 7.

The subtracting block 63 subtracts the detected main injection ignition timing CAFM from the target main injection ignition timing map value CAFMM to calculate an ignition delay angle DCAM. The switching block 64 is on/off controlled by the switching control signal STCL. Specifically, the switching block 64 is turned off when the switching control signal SCTL is equal to "0" and turned on when the switching control signal SCTL is equal to "1" which is contrary to the switching block 46. The filtering block 65 performs filtering using the least-squares method calculation or the moving averaging calculation of data of the ignition delay angle DCAM obtained in a comparatively long time period (e.g., 10-60 seconds) to calculate a filtered ignition delay angle DCAMF.

The ignition delay learning block 66 applies the ignition delay angle DCAMF to the following equation (1) to update a learning value DCAMLRN (i, j) of the ignition delay angle DCAMF. The parameters "i" and "j" are parameters showing an engine operating region defined according to the engine rotational speed NE and the demand torque TRQ. The learning value DCAMLRN (i, j) is calculated corresponding to the engine operating region indicated by the parameters "i" and "j", and is stored in the map.

$$\text{DCAMLRN}(i,j) = a \times \text{DCAMF} + (1-a) \times \text{DCAMLRN}(i,j) \quad (1)$$

where "a" is an averaging coefficient set to a value between "0" and "1" and the DCAMLRN (i, j) on the right side is a map value before updating.

The CAD calculation block 67 adds the crank angle corresponding to the ineffectual opening period of the fuel injection valve 6 to the learning value DCAMFLRN to calculate the fuel injection timing correction amount CAD.

The cetane number estimation block 68 converts the ignition delay angle DCAMF to an ignition delay time period TDFM using the engine rotational speed NE and retrieves a CET table shown in FIG. 8 according to the ignition delay time period TDFM to calculate the cetane number CET. The cetane number estimation block 68 applies the cetane number CET to the following equation (2) to calculate a cetane number learning value CETLRN.

$$\text{CETLRN} = \alpha \times \text{CET} + (1-\alpha) \times \text{CETLRN} \quad (2)$$

where $\alpha$ is an averaging coefficient set to a value between "0" and "1" and the CETLRN on the right side is a preceding calculated value.

When refueling, the cetane number learning value CETLRN is initialized to the minimum value CET0 (for example, 40) among cetane numbers of the fuels distributed in the market and converges to the value indicative of the cetane number of the fuel in use by the subsequent learning. By initializing to the minimum value CET0, even the fuel of the worst ignitionability (flammability) is assured of igniting during a cold start of the engine when using the cetane number learning value CETLRN in the fuel injection timing control described below.

The cetane number learning value CETLRN described above is calculated using all of the cylinder pressure sensor outputs corresponding to four cylinders. Therefore, an averaging of the cetane number CET, detected for each cylinder, and the cetane numbers CET, whose detection timings are different from each other, is performed by the above-described equation (2).

The KCET calculation block 69 applies the cetane number learning value CETLRN to the following equation (3) to calculate the correction coefficient KCET.

$$\text{KCET} = (\text{CETH} - \text{CETLRN})/(\text{CETH} - \text{CET0}) \quad (3)$$

In the equation (3), CETH is a cetane number (for example, 57) of a high cetane number fuel which is a reference fuel for setting the above-described GAM map. Therefore, if the cetane number learning value CETLRN is equal to the reference high cetane number CETH, the correction coefficient KCET is set to "0", and if the cetane number learning value CETRN is equal to the reference low cetane number CET0, the correction coefficient KCET is set to "1.0".

Figure 5:
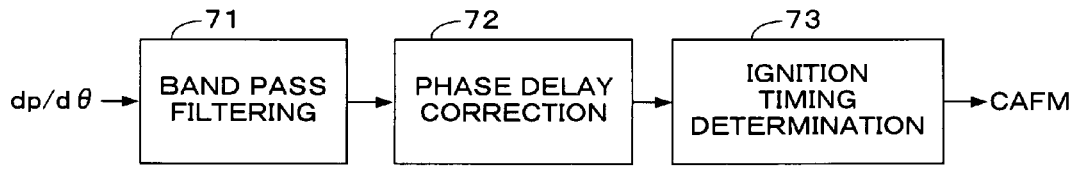
FIG. 5 is a block diagram illustrating a configuration of an ignition timing detection block illustrated in FIG. 3.
Figure 6:
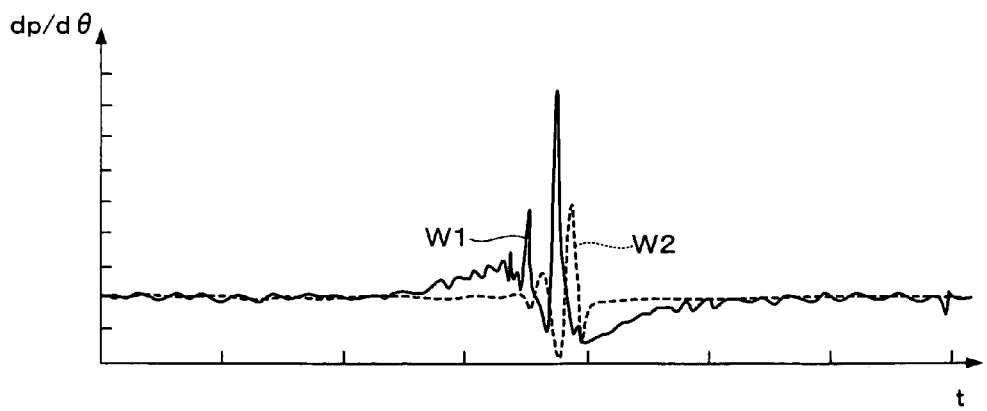
FIG. 6 is a time chart illustrating band pass filtering of a cylinder pressure sensor output.

FIG. 5 is a block diagram illustrating a configuration of the ignition timing detection block 62. The ignition timing detection block 62 includes a band pass filtering block 71, a phase delay correction block 72, and an ignition timing determination block 73. The pressure change rate dp/dθ output from the cylinder pressure sensor 2 is input into the band pass filtering block 71. In FIG. 6, the waveform W1 illustrates an input waveform, and the waveform W2 illustrates an output waveform. The phase delay occurring in the band pass filtering block 71 is corrected in the phase delay correction block 72.

The ignition timing determination block 73 determines a crank angle position CAFP (hereinafter referred to as "pilot injection ignition timing") where the pressure change rate dp/dθ takes a peak value corresponding to the pilot injection and a crank angle position CAFM (hereinafter referred to as "main injection ignition timing") where the pressure change rate dp/dθ takes another peak value corresponding to the main injection. Specifically, as illustrated in FIG. 7C, the crank angle position, where the pressure change rate dp/dθ output from the phase delay correction block 72 exceeds a pilot detection threshold value DPP, is determined to be the pilot injection ignition timing CAFP. The crank angle position, where the pressure change rate dp/dθ exceeds a main detection threshold value DPM, is determined to be the main injection ignition timing CAFM. In this embodiment, only the main injection ignition timing CAFM is used for calculating the fuel injection timing correction amount CAD and estimating the cetane number CET.

FIGS. 7A and 7B illustrate a pilot injection pulse INJP started from a crank angle position CAIP and a main injection pulse INJM started from a crank angle position CAIM. FIG. 7C illustrates an angle position range RDET (for example, 10 degrees) where the ignition timings CAFP and CAFM are detected. By limiting the detection angle position range RDET to a comparatively narrow range, as illustrated in FIG. 7C, the ignition timing is accurately determined without increasing the calculation load on the CPU 14.

As described above, the target main injection ignition timing map value CAFMM is calculated according to the engine rotational speed NE and the demand torque TRQ, the main injection ignition timing CAFM is detected, and the ignition delay angle DCAM of the main injection ignition timing CAFM with respect to the target main injection ignition timing map value CAFMM is calculated. Further, the fuel injection timing correction amount CAD is calculated according to the calculated ignition delay angle DCAM, and the main injection timing map value CAIMM is corrected with the fuel injection timing correction amount CAD. By calculating the ignition delay angle DCAM of the actual ignition timing with respect to the target ignition timing, which is previously set according to the engine rotational speed NE and the demand torque TRQ, and calculating the fuel injection timing correction amount CAD according to the ignition delay angle DCAM, the calculation load on the control system is reduced, wherein controllability of the control system is improved.

Further, the learning value DCAMLRN of the ignition delay angle is calculated for every corresponding operating region using the calculated ignition delay angle DCAMF to update the learning value (DCAMLRN) map. The learning value DCAMLRN is used for correcting the fuel injection timing. Therefore, it is possible to prevent the ignition timing from deviating from the desired value unless the cetane number of the fuel changes.

In the present embodiment, the fuel injection valve 6 corresponds to the fuel injection means, and the crank angle position sensor 3 and the accelerator sensor 21 correspond to the operating condition detection means. Further, the ECU 4 includes the fuel injection control means, the ignition timing storing means, a part of the ignition timing detecting means, the fuel injection timing storing means, and the fuel injection timing correction amount calculating means. Specifically, the CAIMM map corresponds to the fuel injection timing storing means and the CAFMM map corresponds to the ignition timing storing means. The cylinder pressure sensor 2 and the ignition timing detection block 62 correspond to the ignition timing detecting means. The subtraction block 63, the filtering block 65, the ignition delay learning block 66 and the CAD calculation block 67 correspond to the fuel injection timing correction amount calculating means. The main injection timing map value calculation block 51 and the adding block 52 correspond to the fuel injection control means.

The present invention is not limited to the embodiment described above, and various modifications may be made thereto. For example, the main injection timing calculation block 32 may be configured as illustrated in FIG. 10. The main injection timing calculation block 32 illustrated in FIG. 10 further includes a main injection timing learning block 53 and a switching block 54 in addition to the main injection timing map value calculation block 51 and the adding block 52. The main injection timing learning block 53 applies the corrected main injection timing CAIM to the following equation (4) to update the learning value CAIMLRN (i, j) of the main injection timing CAIM. The parameters "i" and "j" are parameters which show an engine operating region defined according to the engine rotational speed NE and the demand torque TRQ.

$$CAIMLRN(i,j) = b \times CAIM + (1-b) \times CAIMLRN(i,j) \quad (4)$$

where "b" is an averaging coefficient set to a value between "0" and "1", and CAIMLRN (i, j) on the right side is a map value before updating.

The switching block 54 is controlled to usually select the output of the adding block 52, as illustrated, and to select the output of the main injection timing learning block 53, for example, when the learning of the main injection timing has been completed after refueling. Therefore, after completion of the learning, it is possible to perform the fuel injection at the suitable fuel injection timing from the instant engine operation begins.

In the above-described embodiment, the calculation of the ignition delay angle and the cetane number estimation are performed based on the main injection ignition timing CAFM corresponding to the main injection. Alternatively, the calculation of the ignition delay angle and the cetane number estimation may be performed based on the pilot injection ignition timing CAFP corresponding to the pilot injection. Further, the pilot injection timing may be corrected according to the ignition delay angle.

The CAFMM map on which the target main injection ignition timing is set may be used for calculating the main injection timing instead of the CAIMM map described above. In this case, the main injection timing CAIM is calculated by adding the average ignition delay angle and the crank angle corresponding to the ineffectual opening period of the fuel injection valve to the target main injection ignition timing CAFMM obtained by retrieving the CAFMM map.

Further, a target ignition delay angle calculation block may be provided instead of the target main injection ignition timing map value calculation block 61, and the ignition delay angle DCAMD with respect to the fuel injection timing may be detected in the ignition timing detection block 62. In this case, the target ignition delay angle calculation block retrieves a DCAMDM map to calculate a target ignition delay angle DCAMDM. The target ignition delay angles DCAMDM are previously set on the DCAMDM map according to the engine rotational speed NE and the demand torque TRQ. The subtraction block 63 calculates the deviation of the detected ignition delay angle DCAMD from the target ignition delay angle DCAMDM. The deviation corresponds to the ignition delay angle DCAM.

Further, in the above-described embodiment, the cylinder pressures in all cylinders are detected to calculate the cetane number learning value CETLRN. Alternatively, only one cylinder pressure sensor may be disposed at a specific cylinder, and the cetane number learning value CETLRN may be calculated based on the cylinder pressure (pressure change rate) detected by the cylinder pressure sensor.

Further, the ignition delay time period TDFM changes depending not only on the cetane number of the fuel but on deterioration of the fuel injection valve 6. Therefore, it is preferable to correct the ignition delay time period TDFM according to the mileage of the vehicle driven by the engine 1, or according to an integrated value of the operating time period of the engine 1.

In the above-described embodiment, an example of the 4-cylinder diesel internal combustion engine is shown. The present invention can be applied to a diesel internal combustion engine having another number of cylinders, or a watercraft propulsion engine, such as an outboard engine having a vertically extending crankshaft.

The present invention may be embodied in other specific forms without departing from the spirit or essential characteristics thereof. The above-disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for an internal combustion engine having fuel injection means provided in a combustion chamber of the engine for injecting fuel into the combustion chamber, the control system comprising:

operating condition detecting means for detecting an operating condition of the engine;

fuel injection timing storing means for storing fuel injection timings performed by the fuel injection means, the fuel injection timings being set according to the operating condition of the engine and on a property of a predetermined fuel;

fuel injection control means for retrieving the fuel injection timing stored in the fuel injection timing storing means according to the detected engine operating condition to determine the fuel injection timing, and executing a fuel injection through the fuel injection means;

ignition timing storing means for storing target compression ignition timings of the fuel injected into the combustion chamber, the target compression ignition timings being set according to the operating condition of the engine;

ignition timing detecting means for detecting an actual compression ignition timing of the fuel injected into the combustion chamber, based on a change in a pressure in the combustion chamber; and fuel injection timing correction amount calculating means for calculating an ignition delay of the actual compression ignition timing with respect to the target compression ignition timing, and calculating a fuel injection timing correction amount according to the calculated ignition delay, the ignition delay being due to a difference between the predetermined fuel and the injection fuel, wherein the fuel injection control means corrects the fuel injection timing with the fuel injection timing correction amount, and executes the fuel injection according to the corrected fuel injection timing, and wherein the fuel injection timing correction amount calculating means includes ignition delay learning value calculating means for calculating a learning value of the ignition delay, and calculates the fuel injection timing correction amount using the learning value of the ignition delay.

2. A control system for an internal combustion engine having fuel injection means provided in a combustion chamber of the engine for injecting fuel into the combustion chamber, the control system comprising:

operating condition detecting means for detecting an operating condition of the engine;

fuel injection timing storing means for storing fuel injection timings performed by the fuel injection means, the fuel injection timings being set according to the operating condition of the engine and on a property of a predetermined fuel;

fuel injection control means for retrieving the fuel injection timing stored in the fuel injection timing storing means according to the detected engine operating condition to determine the fuel injection timing, and executing a fuel injection through the fuel injection means;

ignition timing storing means for storing target compression ignition timings of the fuel injected into the combustion chamber, the target compression ignition timings being set according to the operating condition of the engine;

ignition timing detecting means for detecting an actual compression ignition timing of the fuel injected into the combustion chamber, based on a change in a pressure in the combustion chamber; and fuel injection timing correction amount calculating means for calculating an ignition delay of the actual compression ignition timing with respect to the target compression ignition timing, and calculating a fuel injection timing correction amount according to the calculated ignition delay, the ignition delay being due to a difference between the predetermined fuel and the injection fuel, wherein the fuel injection control means corrects the fuel injection timing with the fuel injection timing correction amount, and executes the fuel injection according to the corrected fuel injection timing, and wherein the fuel injection control means includes fuel injection timing learning means for calculating a learning value of the corrected fuel injection timing, which is based on an engine rotational speed and an engine demand torque, and executes the fuel injection according to the learning value of the fuel injection timing.

3. The control system according to claim 2, wherein the fuel injection control means executes the fuel injection using the learning value of the fuel injection timing when the leaning of the main injection timing has been completed after refueling.

4. A control method for an internal combustion engine having at least one fuel injection valve provided in a combustion chamber of the engine for injecting fuel into the combustion chamber, the control method comprising the steps of:

a) detecting an operating condition of the engine;

b) retrieving a fuel injection timing map according to the detected operating condition of the engine to determine a fuel injection timing, the fuel injection timing map being set according to the operating condition of the engine and on a property of a predetermined fuel:

c) executing a fuel injection through the at least one fuel injection valve;

d) detecting an actual compression ignition timing of the fuel injected to the combustion chamber, based on a change in a pressure in the combustion chamber;
e) retrieving a target ignition timing map according to the detected operating condition of the engine, to calculate a target compression ignition timing of the fuel injected into the combustion chamber, the target ignition timing map being set according to the operating condition of the engine;
f) calculating an ignition delay of the actual compression ignition timing with respect to the target compression ignition timing, the ignition delay being due to a difference between the predetermined fuel and the injected fuel;
g) calculating a fuel injection timing correction amount according to the calculated ignition delay; and
h) correcting the fuel injection timing with the fuel injection timing correction amount, wherein the fuel injection is executed according to the corrected fuel injection timing,
i) calculating a learning value of the ignition delay, wherein the fuel injection timing correction amount is calculated using the learning value of the ignition delay.

5. The control method according to claim 4, further comprising the step of calculating a learning value of the corrected fuel injection timing, wherein the fuel injection is executed according to the learning value of the fuel injection timing.

6. The control method according to claim 5, wherein the fuel injection using the learning value of the fuel injection timing is executed when the learning of the main injection timing has been completed after refueling.

* * * * *